(12) United States Patent
Bezbaruah et al.

(10) Patent No.: US 8,819,657 B1
(45) Date of Patent: Aug. 26, 2014

(54) METHOD AND APPARATUS FOR MAINTAINING DATA CONSISTENCY IN A VIRTUALIZED APPLICATION DURING SOFTWARE UPDATE INSTALLATION

(75) Inventors: Angshuman Bezbaruah, Pune (IN); Chirag Deepak Dalal, Mumbai (IN)

(73) Assignee: Symantec Corporation, Mountain View, CA (US)

( * ) Notice: Subject to any disclaimer, the term of this patent is extended or adjusted under 35 U.S.C. 154(b) by 1375 days.

(21) Appl. No.: 12/233,227

(22) Filed: Sep. 18, 2008

(51) Int. Cl.
*G06F 9/44* (2006.01)
*G06F 9/445* (2006.01)

(52) U.S. Cl.
CPC ........................................ *G06F 8/65* (2013.01)
USPC .......................................................... 717/168

(58) Field of Classification Search
CPC ....................................................... G06F 8/65
USPC ......................................................... 717/168
See application file for complete search history.

(56) References Cited

U.S. PATENT DOCUMENTS

| | | | |
|---|---|---|---|
| 7,117,495 B2 * | 10/2006 | Blaser et al. ................... | 717/174 |
| 2005/0085222 A1 * | 4/2005 | Przybilski et al. ............. | 455/418 |
| 2005/0132351 A1 * | 6/2005 | Randall et al. ................. | 717/168 |
| 2009/0249324 A1 * | 10/2009 | Brar et al. ...................... | 717/173 |

FOREIGN PATENT DOCUMENTS

WO     WO 2008038063 A1 *  4/2008

* cited by examiner

*Primary Examiner* — Wei Zhen
*Assistant Examiner* — Lanny Ung
(74) *Attorney, Agent, or Firm* — Wilmer Cutler Pickering Hale and Dorr LLP

(57) ABSTRACT

A method and apparatus for maintaining data consistency in a virtualized application during software update installation. In one embodiment, the method includes processing software update data associated with a software update installation for a virtualized application, wherein the virtualized application comprises at least one of read-only data or read-write data and coupling the software update data with the at least one of a read-only data or a read-write data, wherein the software update data overrides the at least one of read-only data or read-write data.

20 Claims, 6 Drawing Sheets

US 8,819,657 B1

METHOD AND APPARATUS FOR MAINTAINING DATA CONSISTENCY IN A VIRTUALIZED APPLICATION DURING SOFTWARE UPDATE INSTALLATION

BACKGROUND OF THE INVENTION

1. Field of the Invention

Embodiments of the present invention generally relate to a software application virtualization systems and, more particularly, to a method and apparatus for maintaining data consistency in a virtualized application during software update installation.

2. Description of the Related Art

In a typical computing environment, an organization may employ any number of technologies to process, store, produce and secure mission critical data. For example, the organization may employ one or more data protection system to backup and recover the mission critical data after a disaster or data corruption. As another example, the organization may employ one or more security systems to detect and/or mitigate network-based threats, such as viruses, intrusions, SPAM and/or the like. Furthermore, the organization may employ one or more virtualization techniques to create one or more abstract computer resources (e.g., virtual machines, virtual applications, virtual desktops, virtual hardware devices and/or the like) from physical computer resources.

Virtualized applications are isolated from the local resources on the physical machine. Conventionally, a virtualized application is installed as a layer (e.g., one or more portions of memory that are isolated from the local resources on the physical machine). Any modifications made during the installation are captured in a read-only portion or sub-layer of the virtualized application (layer). The read-only sub-layer preserves a state of the original installation. Any subsequent modifications made by the virtualized application are stored in a read-write sub-layer. Accordingly, the read-write sub-layer overrides the read-only sub-layer. Regardless, if the read-write sub-layer were to be deleted and recreated as an empty sub-layer, the virtualized application would revert back to the read-only sub-layer and operate as it did when initially installed.

Data within the read-only sub-layer and the read-write sub-layer becomes inconsistent in certain situations. For example, the virtualized application may be updated through the virtualization layer provided by the virtualization software (e.g., an update mechanism of a virtualization interface). If a recent software update is installed through the virtualization software, the modifications (e.g., software update data) are reflected in the read-only sub-layer. In addition, the virtualized application (e.g., MOZILLA FireFox 2.0) may have an internal update mechanism (e.g., a menu option to update files). If a software update is installed through such an internal update mechanism, then the modifications are captured in the read-write sub-layer. If such a software update happens to be an older version of the application, then these updates would override the more recent updates in the read-only sub-layer. Consequently, more recent files within the read-only sub-layer are overridden by outdated, older versions of the same files within the read-write sub-layer. As a result, the more recent software update is essentially ineffective. This consistency causes problems during the operation of the virtualized application especially if the more recent software update includes one or more files that were not included in the older software update.

Therefore, there is a need in the art for a method and apparatus for maintaining data consistency in a virtualized application during software update installation.

SUMMARY OF THE INVENTION

Embodiments of the present invention generally comprise a method and apparatus for maintaining data consistency in a virtualized application during software update installation. In one embodiment, a method for maintaining data consistency during a software update installation for a virtualized application includes processing software update data associated with a software update installation for a virtualized application, wherein the virtualized application comprises at least one of read-only data or read-write data and coupling the software update data with the at least one of a read-only data or a read-write data, wherein the software update data overrides the at least one of read-only data or read-write data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
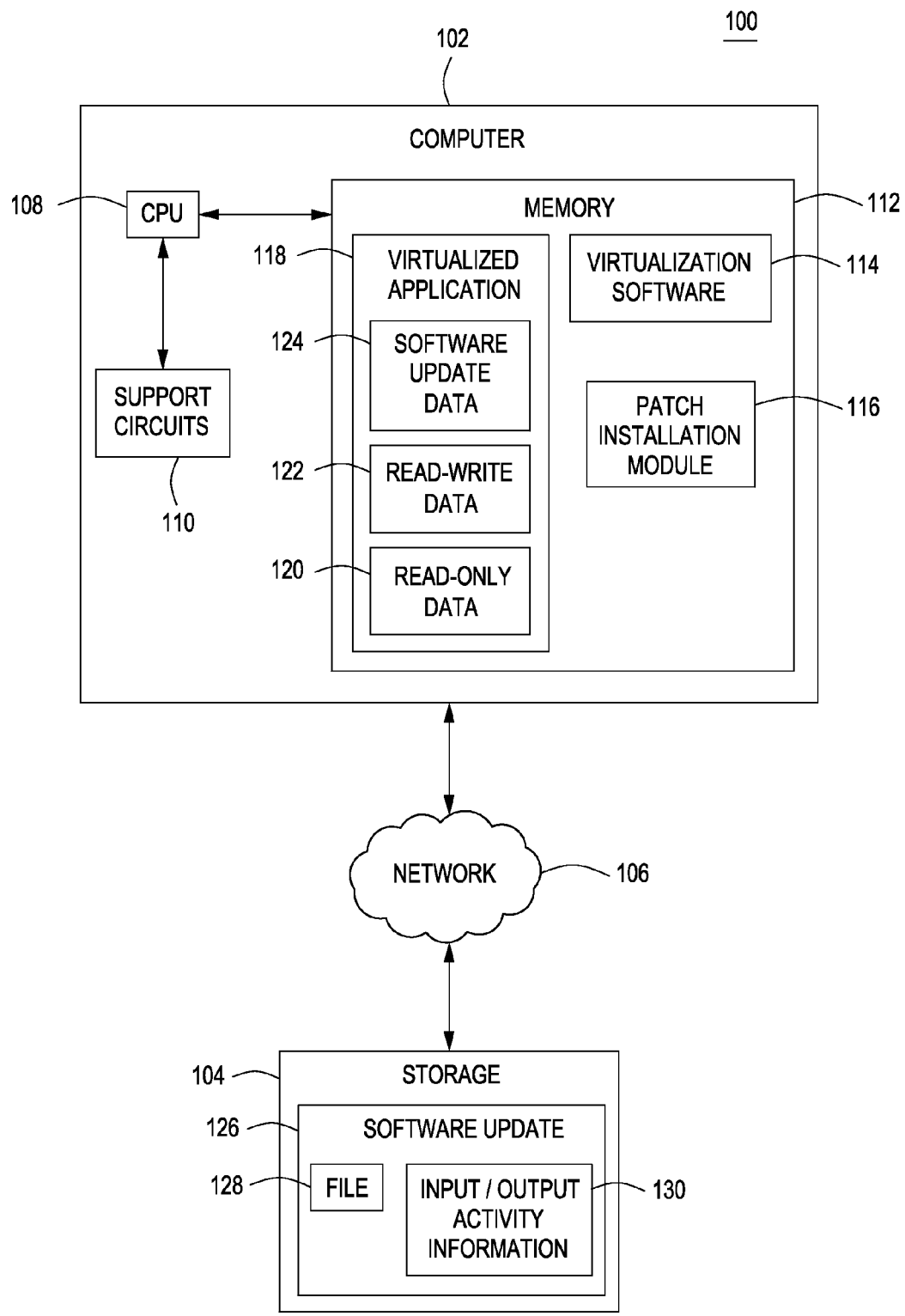
FIG. 1 is a block diagram of a system for maintaining data consistency in a virtualized application during software update installation according to one or more embodiments of the present invention.

FIG. 1 is a block diagram of a system 100 for maintaining data consistency in a virtualized application during software update installation according to one or more embodiments of the present invention. In one embodiment, the system 100 includes a computer 102 and storage 104 where each is coupled to each other through a network 106.

The computer 102 is a type of computing device (e.g., a laptop, a desktop, a Personal Desk Assistant (PDA), a tablet, a mobile phone and the like) that comprises a central processing unit (CPU) 108, various support circuits 110 and a memory 112. The CPU 108 may comprise one or more commercially available microprocessors or microcontrollers that facilitate data processing and storage. Various support circuits 110 facilitate operation of the CPU 108 and may include clock circuits, buses, power supplies, input/output circuits and/or the like. The memory 112 includes a read only memory, random access memory, disk drive storage, optical storage, removable storage, and the like. The memory 112 includes various software packages, such as virtualization software 114 and an installation module 116. The memory 112 further includes a virtualized application 118 (e.g., an environment within the memory 112 that is isolated from local resources (e.g., an operating system, a system registry and/or the like) at the computer 102).

Generally, the virtualization software 114 (e.g., MICROSOFT SoftGrid Application Virtualization (Soft-Grid), Altiris Software Virtualization Solution (SVS) and/or the like) is configured to create an isolated environment for an instance of a software application (i.e., the virtualized application 118). In one embodiment, the virtualization software 114 provides an abstraction interface between the virtualized application 118 and the local resources (e.g., an operating system) of the computer 102. Accordingly, the virtualized application 118 operates normally while the virtualization software 114 redirects input/output activity (e.g., storage and/or file system operations) to locations within the isolated environment (e.g., as application virtualization operations). Hence, the virtualization software 114 prevents the virtualized application 118 from adversely affecting any of the local resources.

In one embodiment, the virtualized application 118 is instantiated on the computer 102 as a layer. Within such a layer, various files, settings and other data may be stored to produce an environment that is isolated from the local resources as described above. As such, running the virtualized application 118 within such an environment does not alter or otherwise modify any system files (e.g., registry entries, operating system files and/or the like). For example, the virtualized application 118 may include copies of application files, registry entries, .INI files, fonts, COM/DCOM objects, semaphores and/or like.

The storage 104 generally includes various components (i.e., hardware and software) that are configured to manage storage resources within the system 100. The storage 104 includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for the computer 102. The storage 104 facilitates permanent storage of various data and/or software, such as a software update 126.

The software update 126 includes software code that modifies (i.e., updates) the virtualized application 118. For example, the software update 126 may be a patch for an application, such as MOZILLA FireFox. In one embodiment, the software update 126 includes various files to be copied to the virtualized application 118, such as a file 128 (e.g., a new file or a new version of a previously installed file (e.g., XYZ-.dll)). In addition, the software update 126 includes input/output activity information 130. Generally, the input/output activity information 130 includes one or more file system operations to be applied to the virtualization application 118 (i.e., the layer for the virtualized application 118). In another embodiment, the virtualization software 114 processes the input/output activity information 130 and generates one or more application virtualization operations for installing the software update 126.

According to various embodiments of the present invention, the virtualized application 118 includes read-write data 122 and/or read-only data 120. In one embodiment, the read-write data 122 includes software update data 124. In one optional embodiment, the read-only data includes the software update data 124. Generally, the software update data 124 includes one or more modifications (e.g., file/setting changes, new files and/or the like) to the virtualized application 118 (e.g., the read-only data 120 and/or the read-write data 122). In operation, the one or more modifications may be performed during installation of the software update 126 and captured in the virtualized application 118 as the software update data 124.

In one embodiment, the read-only data 120 and/or the read-write data 122 are sub-layers in the layer for the virtualized application 118. Optionally, the read-only data 120 includes the software update data 124. In one embodiment, the virtualized application 118 also includes a sub-layer for the software update data 124 in addition to sub-layers for the read-write data 122 and the read-only data 120. The sub-layer for the software update data 124 may be configured to include read-write permissions. As explained below, the software update data 124 is coupled with the read-write data 122 and/or the read-only data 120 during the installation of the software update 126.

In one embodiment, the virtualized application 118 only includes a sub-layer for the read-only data 120. For example, when the virtualized application 118 is initially instantiated into the layer, the read-write sub-layer and the software update sub-layer do not yet exist because no modifications have been made to the virtualized application 118. As another example, after the software update 126 is completely installed on the virtualized application 118, the software update sub-layer and/or the read-write sub-layer may become a portion of the read-only sub-layer or simply deleted. In another embodiment, the virtualized application 118 only includes a sub-layer for the read-write data 122 and the read-only data 120. For example, after the software update 126 is completely installed, the software update sub-layer may become a top-level read-write sub-layer and the previous read-write sub-layer may become a new read-only sub-layer.

In one embodiment, the software update 126 may be installed through an internal update mechanism associated with the virtualized application 118 (e.g., "Update Now" for MOZILLA FireFox 2.0) in which the software update data 124 is reflected in the read-write sub-layer and overrides the read-only sub-layer. Alternatively, the software update 126 may be installed through the virtualization software 114 (i.e., an update mechanism through a virtualization interface) in which the software update data 124 is reflected in the read-only sub-layer. Subsequently, corresponding versions of the software update data 124 are removed from the read-write sub-layer according to one embodiment.

The installation module 116 includes software code that is configured to install the software update 126 on the virtualized application 118 such that the read-write data 122 and the read-only 120 are consistent. In operation, the installation module 116 accesses the software update 126. In one embodiment, the installation module 116 accesses one or more files, such as the file 128, and the input/output activity information 130 in order to process one or more file system operations for installing the software update 126. Subsequently, the installation module 116 couples the software update data 124 to the read-write data 122 and/or the read-only data 120 where the software update data 124 overrides the read-write data 122 and/or the read-only data 120.

In one embodiment, the installation module 116 cooperates with the virtualization software 114 to perform the installation of the software update 126 (i.e., an update mechanism through a virtualization interface). For example, the installation module 116 uses the virtualization interface to create the software update sub-layer with read-write permissions for capturing the software update data 124 as explained below. Alternatively, the installation module 116 uses the virtualization interface to store the software update data 124 in the read-only sub-layer. Then, the installation module 116 removes previous versions of the software update data 124 from the read-write sub-layer.

In one embodiment, the installation module 116 and the virtualization software 114 process the input/output activity information 130 to determine one or more application virtualization operations (e.g., exported by the virtualization software 114 to be applied on the layer for the virtualized application 118 by the installation module 116, such as a commit operation, a rollback operation or a file system operation). Then, the installation module 116 applies the one or more application virtualization operations to the software update sub-layer to capture the software update data 124 according to one embodiment. The software update data 124 overrides the read-only data 120 and/or the read-write data 122 because the software update sub-layer is a top-level read-write sub-layer.

In one embodiment, the installation module 116 applies a rollback operation to remove the file 128 from the software update data 124. For example, the installation module 116 deletes the file 128 from the software update sub-layer. In another embodiment, the installation module 116 and the virtualization software 114 applies a commit operation to merge the file 128 with the read-only data 120 and/or the read-write data 122 in order to ensure data consistency without the software update sub-layer. The installation module 116 overwrites a previous version of the file 128 in the read-only data 120 with a current version of the file 128. In addition, the installation module 116 removes the previous version of the file 128 from the read-write data 122. The software update data 124 overrides the read-only data 120 and/or the read-write data 122 because the file 128 stored in the read-only data 120 is a most recent version in the virtualized application 118.

In one embodiment, the installation module 116 does not apply the commit operation and/or the rollback operation to ensure data consistency for the virtualized application 118. For example, because the software update data 124 is presented as a top-level read-write sub-layer to the virtualized application 118, the software update data 124 does not have to be committed or rolled back in order to override the read-write data 122 and/or the read-only data 120.

The installation module 116 modifies the read-write data 122 and/or the read-only data 120 to ensure data consistency as the software update data 124 is captured according to one or more embodiments. In one embodiment, the installation module 116 configures the read-write data 122 as read-only and stores the software update data 124 in the virtualized application 118 with read-write permissions. Thus, the software update data 124 overrides the read-only data 120 and/or the read-write data 122. For instance, the software update data 124 becomes a top-level read-write sub-layer that overrides one or more bottom-level read-only sub-layers in accordance with the virtualized application 118.

For example, the installation module 116 uses the virtualization software 114 to create a sub-layer with read-write permissions for capturing the software update data 124 and set a read-only attribute for the read-write sub-layer. Then, the installation module 116 applies one or more application virtualization operations to the software update sub-layer to install the software update. Therefore, the software update sub-layer overrides the read-only sub-layer and/or the previously read-write sub-layer (e.g., the software update data 124 overrides previous versions of any data for the virtualized application 118 that is stored in the read-only sub-layer or the previously read-write sub-layer).

In one embodiment, the installation module 116 couples the read-only data 120 with the software update data 124. In one embodiment, the installation module merges various portions (e.g., the file 128) of the software update data 124 with the read-only data 120 and/or the read-write data 122 in which previous versions of software update data 124 are overridden. For example, the installation module 116 identifies a commit operation associated with the file 128 while applying the one or more application virtualization operations to the software update sub-layer. Subsequently, the installation module 116 examines the read-only sub-layer and/or the read-write sub-layer (e.g., previously read-write sub-layer now configured to be read-only) in order to identify the file 128 (i.e., a corresponding version of the file 128, such as a previous version). As an example, if a previous version of the file 128 is in the read-only sub-layer and/or the previously read-write sub-layer, then the installation module 116 deletes the previous version of the file 128.

Furthermore, the file 128 is coupled with the read-only sub-layer. For instance, the file 128 is copied from the software update sub-layer to the read-only sub-layer. The other copy of the file 128 in the software update sub-layer is deleted. Moreover, the previously read-write sub-layer is reverted as read-write again. As a result, the virtualized application 118 only uses a most recent version of the file 128. Hence, the installation module 116 merges the software update data 124 with the read-only data 120 in order to facilitate correct operation of the virtualized application 118 by maintaining consistency amongst versions of the files used by the virtualized application 118.

On the other hand, the installation module 116 may identify a rollback operation during the application of the one or more application virtualization operations on the software update sub-layer. Performance of the rollback operation involves undoing one or more modifications to the virtualized application 118 (e.g., removing one or more files from software update data 124). For example, the installation module 116 deletes the file 128 from the software update sub-layer.

Alternatively, the installation module 116 cooperates with an update mechanism associated with the virtualization software 114 to apply one or more application virtualization operations to the read-only sub-layer. As a result, the most recent version of the file 128 is stored in the read-only sub-layer. Hence, the software update sub-layer (i.e., a top-level read-write sub-layer) is not created to capture the software update data 124. Then, the installation module 116 examines the read-write sub-layer to identify the file 128 (e.g., a version of the file 128, such as a previous version) in the read-write sub-layer. If the previous version of the file 128 is in the read-write sub-layer, the installation module 116 deletes the previous version.

Figure 2:
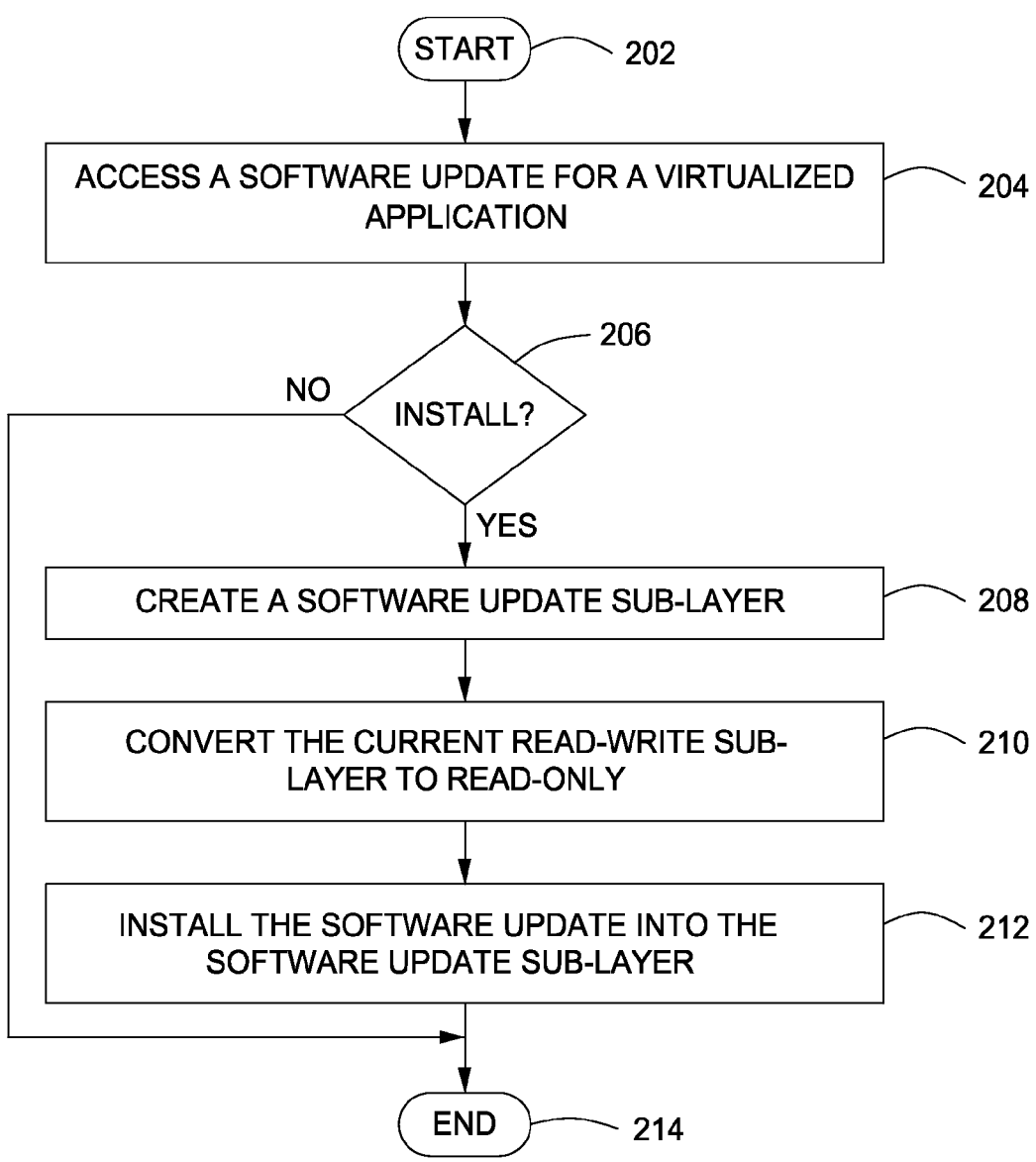
FIG. 2 is a flow diagram of a method for installing a software update in a software update sub-layer to maintain data consistency for a virtualized application according to one or more embodiments of the present invention.

FIG. 2 is a flow diagram of a method 200 for installing a software update in a software update sub-layer to maintain data consistency for a virtualized application according to one or more embodiments of the present invention. The method 200 starts at step 202 and proceeds to step 204 where a software update (e.g., the software update 126 of FIG. 1) for a virtualized application (e.g., the virtualized application 118 of FIG. 1) is accessed.

At step 206, a determination is made as to whether the software update is to be installed on the virtualized application. If the software update is to be installed, then the method 200 proceeds to step 208. If the software update is not to be installed, then the method 200 proceeds to step 214. At step 208, a software update sub-layer is created for capturing software update data. At step 210, a current read-write sub-layer (e.g., the read-write data 122) is converted to read-only. At step 212, the software update is installed into the software update sub-layer. At step 214, the method 200 ends. Hence, the software update data is captured in the software update sub-layer, which is coupled to the original read-write sub-layer (currently read-only) and an original read-only sub-layer.

Figure 3:
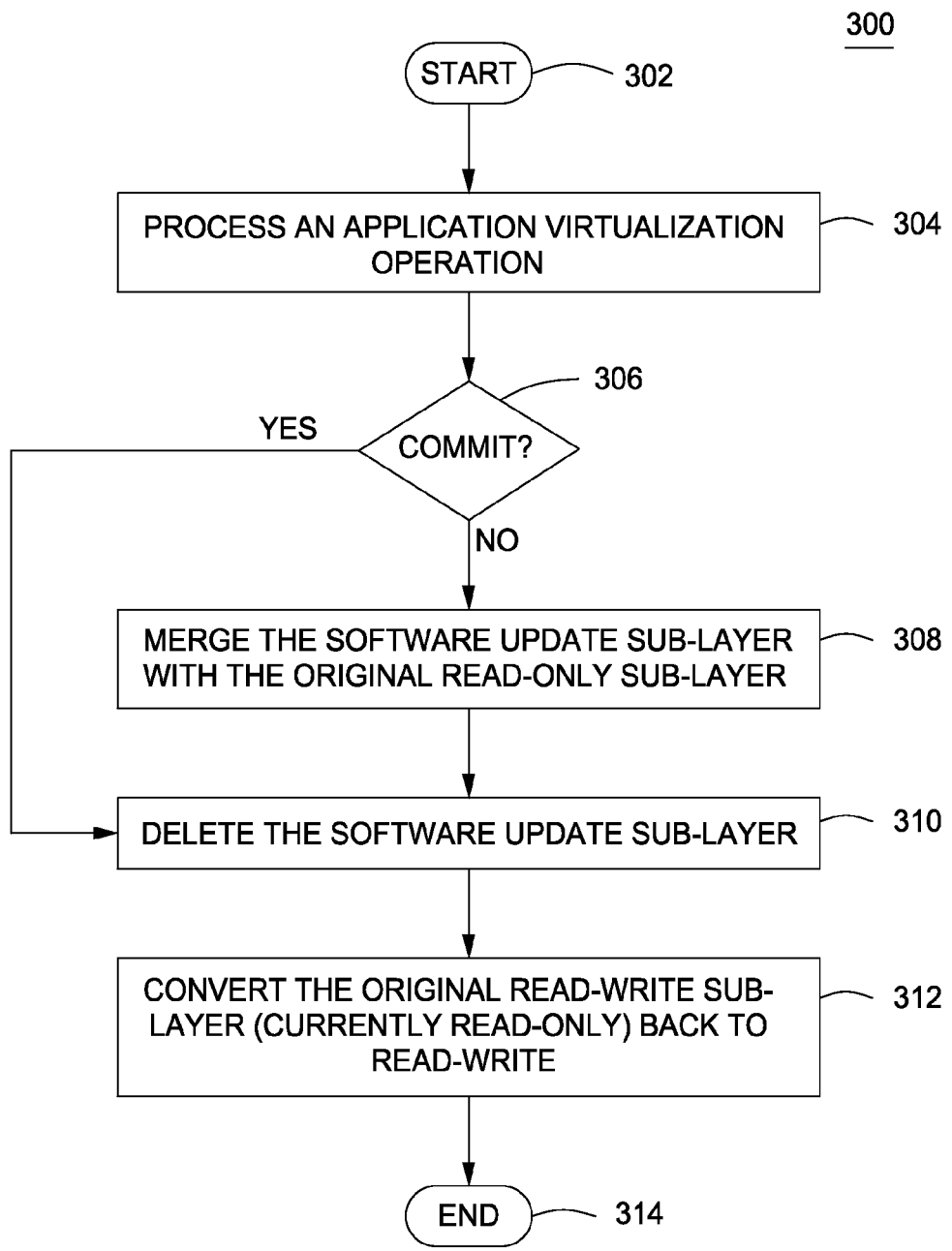
FIG. 3 is a flow diagram of a method for applying one or more application virtualization operations on a software update sub-layer according to one or more embodiments of the present invention.

FIG. 3 is a flow diagram of a method 300 for applying an application virtualization operation on a software update sub-layer according to one or more embodiments of the present invention. The method 300 begins at step 302 and proceeds to step 304. In one embodiment, steps 304 to 312 are performed subsequent to the method 200 as illustrated in FIG. 2.

At step 304, an application virtualization operation is processed. At step 306, a determination is made as to whether the application virtualization operation is a commit operation. If the application virtualization operation is a commit operation, then the method 300 proceeds to step 308. At step 308, the software update sub-layer is merged with an original read-only sub-layer. If the application virtualization operation is not a commit operation (i.e., a rollback operation), then the method 300 proceeds to step 310. At step 310, the software update sub-layer is deleted. At step 312, an original read-write sub-layer (currently read-only) is converted back to read-write. At step 314, the method 300 ends.

Figure 4:
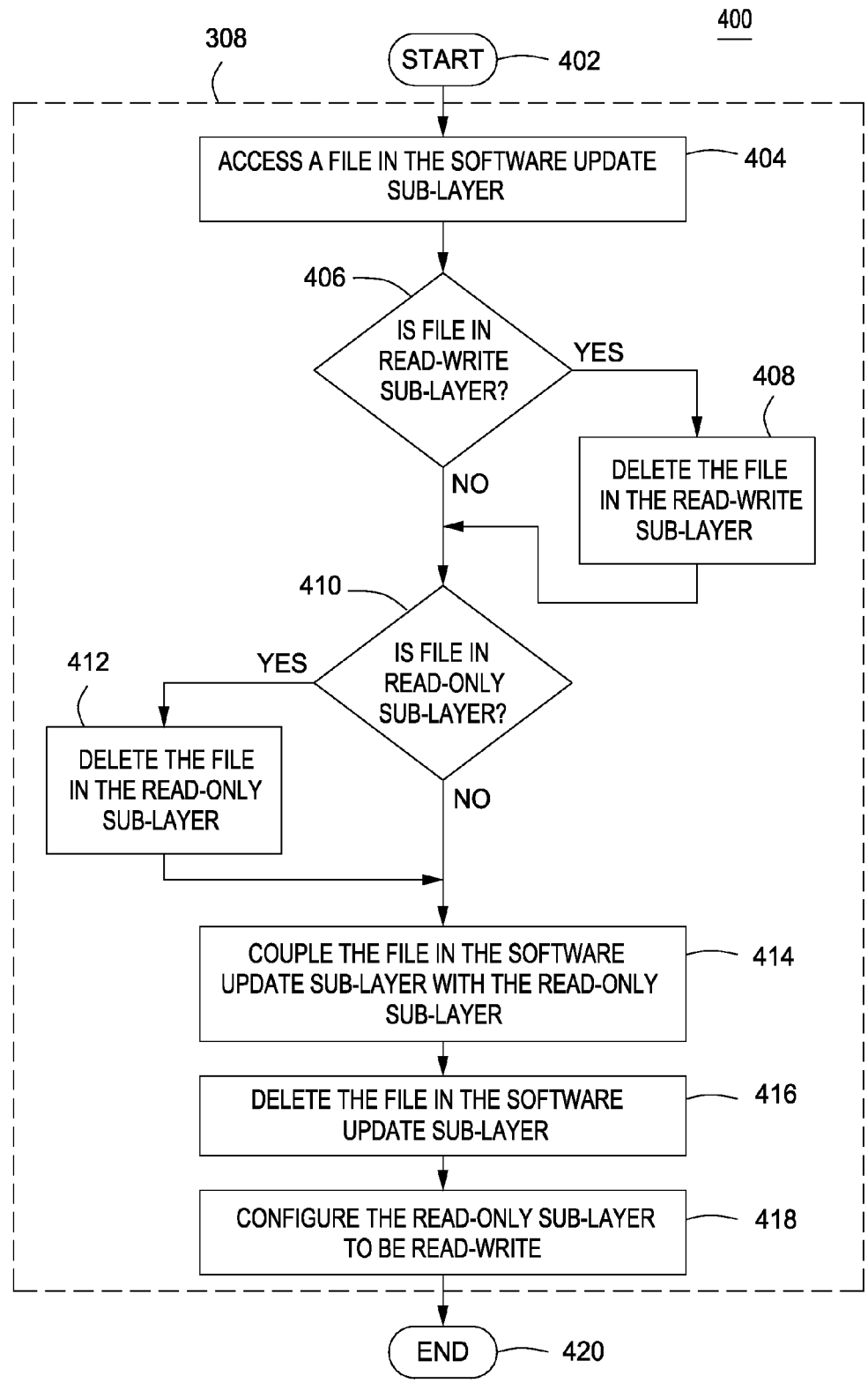
FIG. 4 is a flow diagram of a method for merging a software update sub-layer with a read-only sub-layer according to one or more embodiments of the present invention.

FIG. 4 is a flow diagram of a method for merging a software update sub-layer with the read-only sub-layer according to one or more embodiments of the present invention. The method 400 starts at step 402 and proceeds step 404. Steps 404 to 420 form one embodiment of the step 308 of method 300 as explained for FIG. 3.

At step 404, a file in the software update sub-layer is accessed. At step 406, a determination is made as to whether the file is in a read-write sub-layer (e.g., a previously top-level read-write sub-layer configured to be read-only by the installation module 116 of FIG. 1). If the file is in the read-write sub-layer, the method 400 proceeds to step 408. At step 408, the file in the read-write sub-layer is deleted. After step 408, the method 400 proceeds to step 410. If the file is not in the read-write sub-layer, the method 400 proceeds to step 410. At step 410, a determination is made as to whether the file is in a read-only sub-layer. If the file is in the read-only sub-layer, the method 400 proceeds to step 412.

At step 412, the file in the read-only sub-layer is deleted. If the file is not in the read-only sub-layer, the method 400 proceeds to step 414. At step 414, the file in the software update sub-layer is copied to the read-only sub-layer. At step 416, the file in the software update sub-layer is deleted. At step 418, the read-write sub-layer is configured to be read-write. In one embodiment, the read-write attribute for the read-write sub-layer is restored. At step 420, the method 400 ends.

Figure 5:
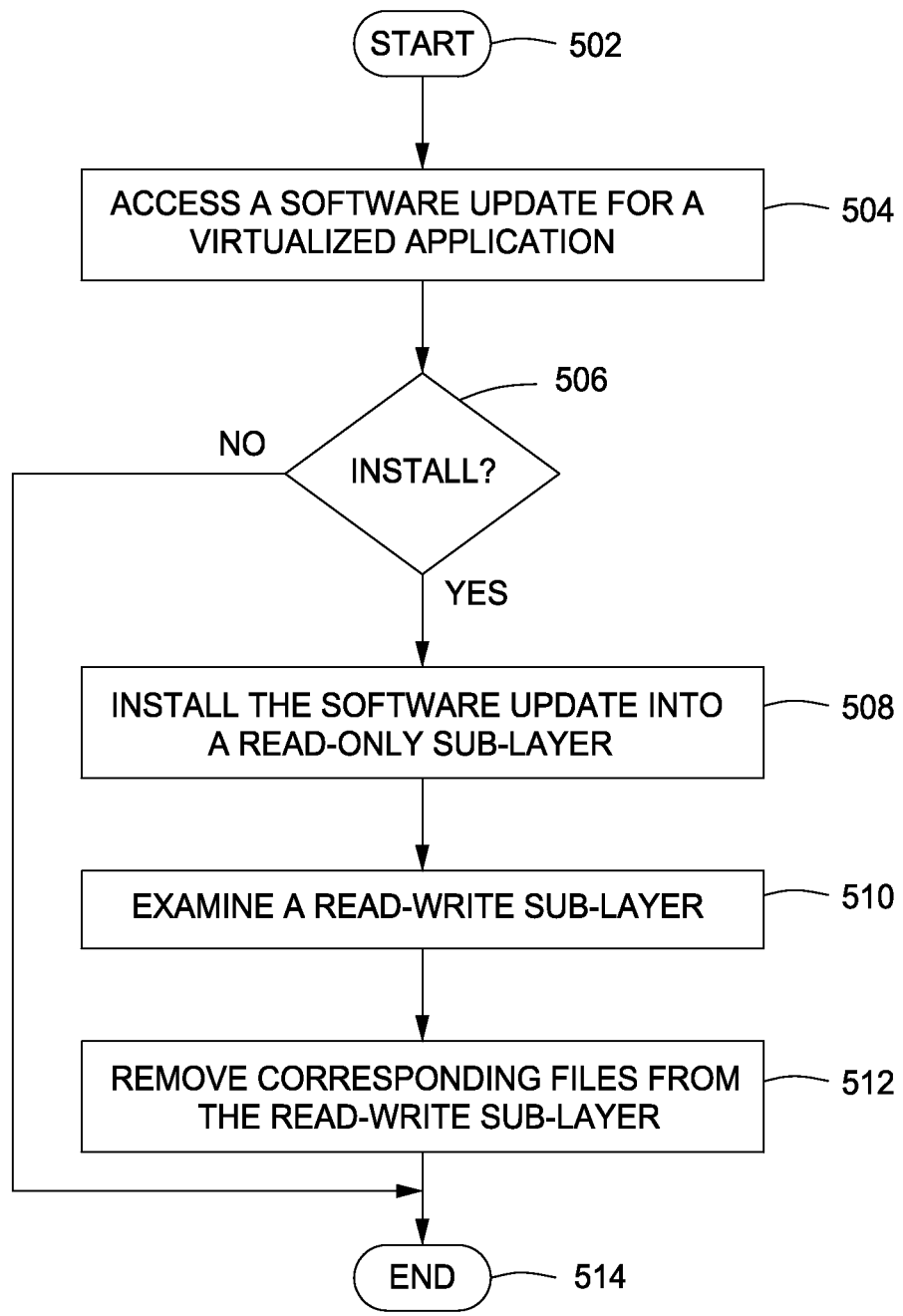
FIG. 5 is a flow diagram of a method for installing a software update in a read-only sub-layer to maintain data consistency for a virtualized application according to one or more embodiments of the present invention.

FIG. 5 is a flow diagram of a method 500 for installing a software update for a virtualized application in a read-only sub-layer to maintain data consistency according to one or more embodiments of the present invention. The method 500 starts at step 502 and proceeds to step 504.

At step 504, a software update (e.g., the software update 126 of FIG. 1) for a virtualized application (e.g., the virtualized application 118 of FIG. 1) is accessed. At step 506, a determination is made as to whether the software update is to be installed on the virtualized application. If the software update is to be installed, then the method 500 proceeds to step 508. If the software update is not to be installed, then the method 500 proceeds to step 514. At step 508, the software update is installed into a read-only sub-layer (e.g., the read-only data 120 of FIG. 1). Accordingly, software update data is captured in the read-only sub-layer through a virtualization interface provided by virtualization software (e.g., the virtualization software 114 of FIG. 1). At step 510, a read-write sub-layer (e.g., the read-write data 122 of FIG. 1) is examined. At step 512, corresponding files are removed from the read-write sub-layer. At step 514, the method 500 ends.

Figure 6:
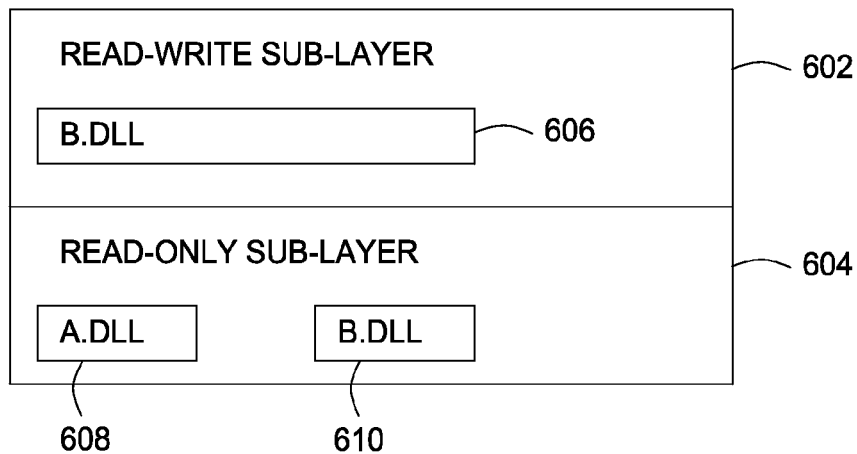
FIG. 6 is a block diagram that illustrates a virtualized application layer, wherein a software update is installed in a read-only sub-layer to maintain data consistency according to one or more embodiments of the present invention.

FIG. 6 is a block diagram that illustrates a virtualized application layer 600, wherein a software update is installed in a read-only sub-layer 604 to maintain data consistency according to one or more embodiments of the present invention. The virtualized application layer 600 (e.g., the virtualized application 118 of FIG. 1) includes a read-write sub-layer 602 (e.g., the read-write data 122 of FIG. 1) and a read-only sub-layer 604 (e.g., the read-only data 120 of FIG. 1). The read-write sub-layer 602 includes one or more files, registry entries and settings for an application, such as a B.DLL 606. Furthermore, the read-only sub-layer 604 includes an A.DLL 608 and a B.DLL 610.

In one embodiment, the A.DLL 608 and the B.DLL 610 are captured in the read-only sub-layer 604 during a software update installation to the virtualized application layer 600. In one embodiment, the B.DLL 606 and the B.DLL 610 are corresponding files in which the B.DLL 606 is a previous version of the B.DLL 610. As a result, the B.DLL 606 is removed from the read-write sub-layer 602 to ensure data consistency for the application. Otherwise, the B.DLL 606 overrides the B.DLL 610 during normal operations of the application.

Figure 7:
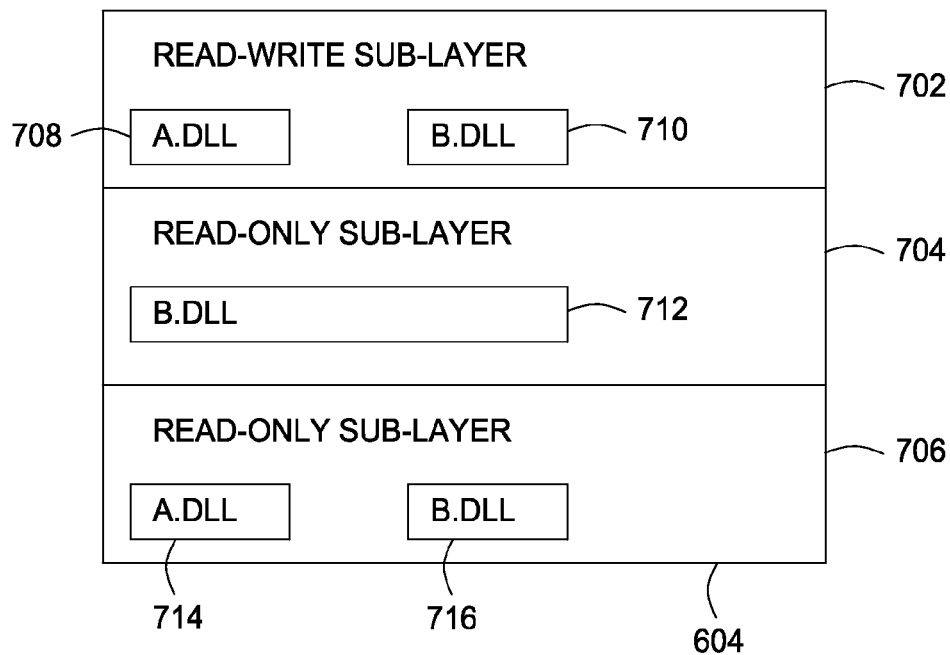
FIG. 7 is a block diagram that illustrates a virtualized application layer, wherein a software update is installed in a software update sub-layer to maintain data consistency according to one or more embodiments of the present invention.

FIG. 7 is a block diagram that illustrates a virtualized application layer 700, wherein a software update is installed in a read-write sub-layer 702 to maintain data consistency according to one or more embodiments of the present invention. The virtualized application layer 700 (e.g., the virtualized application 118 of FIG. 1) includes the read-write sub-layer 702, a read-only sub-layer 704 and a read-only sub-layer 706. The read-write sub-layer 702 is the software update sub-layer and includes one or more files, registry entries and settings for an application, such as A.DLL 708 and B.DLL 710. The read-only sub-layer 704 includes a B.DLL 704. Furthermore, the read-only sub-layer 704 includes an A.DLL 714 and a B.DLL 716.

In one embodiment, the read-write sub-layer 702 is created for capturing the A.DLL 708 and the B.DLL 710 during a software update installation. Furthermore, the read-only sub-layer 704 is a previous read-write sub-layer for the virtualized application layer 700. The read-only sub-layer 704 is modified to be read-only to enable the read-write sub-layer 702 to override the read-only sub-layer 704 and the read-only sub-layer 706. In one embodiment, the B.DLL 710, the B.DLL 712 and the B.DLL 716 are corresponding files in which the B.DLL 712 and the B.DLL 716 are previous versions of the B.DLL 710. As such, the B.DLL 710 overrides the B.DLL 712 and the B.DLL 716 because the read-write sub-layer 702 overrides the read-only sub-layer 704 and the read-only sub-layer 706.

In another embodiment, one or more application virtualization operations may be applied to the virtualized application layer 700. For example, a commit operation is applied to commit the B.DLL 710. As a result, the B.DLL 712 and the B.DLL 716 are removed from the read-only sub-layer 704 and the read-only sub-layer 706, respectively, to ensure data consistency for the application. As another example, a rollback operation is application to rollback the A.DLL 708. As such, the A.DLL 708 is removed from the read-write sub-layer 702.

While the foregoing is directed to embodiments of the present invention, other and further embodiments of the invention may be devised without departing from the basic scope thereof, and the scope thereof is determined by the claims that follow.

The invention claimed is:

1. A method for maintaining data consistency during a software update installation for a virtualized application, comprising:
processing software update data associated with a software update installation for a virtualized application, wherein the virtualized application comprises at least one of read-only data and read-write data; and
coupling the software update data with the at least one of read-only data and read-write data, wherein data comprising the virtual application is stored in a plurality of sub-layers, wherein higher-level sub-layers override data in lower-level sub-layers, wherein the at least one of read-only data and read-write data is stored in a lower-level sub-layer, wherein the software update data is stored in a higher-level sub-layer, thereby overriding the at least one of read-only data and read-write data, wherein coupling the software update data with the at least one of read-only data and read-write data comprises creating a software update sub-layer for capturing the software update data and configuring a read-write sub-layer to be read-only by temporarily converting the read-write sub-layer to a temporary read-only sub-layer, wherein the read-write sub-layer comprises the read-write data.

2. The method of claim 1, wherein coupling the software update data with the at least one of read-only data and read-write data further comprises modifying the at least one of read-only data and read-write data to install a software update.

3. The method of claim 1, wherein coupling the software update data with the at least one of read-only data and read-write data further comprises applying at least one application virtualization operation to the at least one of read-only data and read-write data.

4. The method of claim 1, wherein coupling the software update data with the at least one of read-only data and read-write data further comprises overwriting a previous version of a file of the software update data in the at least one of read-only data and read-write data.

5. The method of claim 1, wherein coupling the software update data with the at least one of read-only data and read-write data further comprises merging a portion of the software update data with the read-only data for a commit operation.

6. The method of claim 1, wherein coupling the software update data with the at least one of read-only data and read-write data further comprises storing a file of the software update data in the read-only data.

7. The method of claim 1, coupling the software update data with the at least one of read-only data and read-write data further comprising:
identifying a previous version of a file of the software update data in the at least one of read-only data and read-write data; and
deleting the previous version of the file.

8. The method of claim 1, wherein coupling the software update data with the at least one of read-only data and read-write data further comprises deleting a portion of the software update data for a rollback operation.

9. The method of claim 1, wherein coupling the software update data with the at least one of read-only data and read-write data further comprising:
identifying a rollback operation associated with a file; and
deleting the file from the software update data.

10. The method of claim 1, wherein coupling the software update data with the at least one of read-only data and read-write data further comprising:
applying at least one application virtualization operation on the software update sub-layer.

11. The method of claim 10 further comprising restoring read-write permissions for the read-write sub-layer.

12. The method of claim 11 further comprising deleting the software update sub-layer.

13. The method of claim 10, wherein applying at least one application virtualization operation further comprises coupling a file of the software update sub-layer with an original read-only sub-layer.

14. The method of claim 13, wherein applying at least one application virtualization operation further comprises deleting a previous version of the file in the read-write sub-layer.

15. An apparatus for maintaining data consistency during a software update installation for a virtualized application, comprising:
at least one computer processor configured to access software update data associated with a software update installation for a virtualized application, wherein the virtualized application comprises at least one of read-only data and read-write data and couple the software update data with the at least one of read-only data and read-write data, wherein data comprising the virtual application is stored in a plurality of sub-layers, wherein higher-level sub-layers override data in lower-level sub-layers, wherein the at least one of read-only data and read-write data is stored in a lower-level sub-layer, wherein the software update data is stored in a higher-level sub-layer, thereby overriding the at least one of read-only data and read-write, wherein coupling the software update data with the at least one of read-only data and read-write data comprises creating a software update sub-layer for capturing the software update data and configuring a read-write sub-layer to be read-only by temporarily converting the read-write sub-layer to a temporary read-only sub-layer, wherein the read-write sub-layer comprises the read-write data.

16. The apparatus of claim 15, wherein the at least one processor is further configured to install the software update on the virtualized application through a virtualization interface provided by virtualization software.

17. The apparatus of claim 15, wherein the read-write sub-layer applies at least one application virtualization operation on the software update sub-layer.

18. The apparatus of claim 17, wherein the at least one processor is further configured to couple a file of the software update sub-layer with an original read-only sub-layer.

19. The apparatus of claim 18, wherein the at least one processor is further configured to delete a previous version of the file in the read-write sub-layer.

20. A system for maintaining data consistency during a software update installation for a virtualized application, comprising:
- a storage, comprising software update data associated with a software update installation; and
- a computer coupled to the storage, comprising:
  - a virtualized application comprising a read-write sub-layer and a read-only sub-layer; and
  - an installation module for creating a software update sub-layer for capturing the software update data, configuring the read-write sub-layer to be read-only by temporarily converting the read-write sub-layer to a temporary read-only sub-layer, wherein the read-write sub-layer comprises read-write data, applying at least one application virtualization operation on the software update sub-layer, and coupling the software update data with the read-only sub-layer, wherein data comprising the virtual application is stored in a plurality of sub-layers, wherein higher-level sub-layers override data in lower-level sub-layers, wherein the at least one of read-only data and read-write data is stored in a lower-level sub-layer, and wherein the software update data is stored in a higher-level sub-layer, thereby overriding previous versions of the software update data.

* * * * *